US010826033B2

(12) United States Patent
Zhang et al.

(10) Patent No.: US 10,826,033 B2
(45) Date of Patent: Nov. 3, 2020

(54) SHELL, BATTERY MODULE AND BATTERY PACK

(71) Applicant: CONTEMPORARY AMPEREX TECHNOLOGY CO., LIMITED, Ningde (CN)

(72) Inventors: Hua Zhang, Ningde (CN); Feng Qin, Ningde (CN); Lin Ma, Ningde (CN); Zhiyi You, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 132 days.

(21) Appl. No.: 16/178,411

(22) Filed: Nov. 1, 2018

(65) Prior Publication Data
US 2019/0207174 A1    Jul. 4, 2019

(30) Foreign Application Priority Data

Dec. 28, 2017    (CN) .................... 2017 2 1886951 U

(51) Int. Cl.
H01M 2/00    (2006.01)
H01M 2/10    (2006.01)
(52) U.S. Cl.
CPC ....... H01M 2/1016 (2013.01); H01M 2/1072 (2013.01)
(58) Field of Classification Search
CPC .................... H01M 2/1072; H01M 2/1016
See application file for complete search history.

(56) References Cited

U.S. PATENT DOCUMENTS

2012/0270097 A1    10/2012  Yasui et al.
2013/0183544 A1*   7/2013   Yoshioka ............ H01M 2/1077
                                                    429/7
2014/0017540 A1*   1/2014   Miyawaki ........... H01M 2/1077
                                                    429/99
2014/0242429 A1    8/2014   Lee et al.

FOREIGN PATENT DOCUMENTS

CN    106601958 A    4/2017
CN    207558892 U    6/2018
EP    3211686 A1    8/2017

OTHER PUBLICATIONS

Contemporary Amperex Technology Co., Limited Extended European Search Report, EP18203737.4, dated Jan. 1, 2019, 7 pgs.

* cited by examiner

Primary Examiner — Cynthia H Kelly
Assistant Examiner — Monique M Wills
(74) Attorney, Agent, or Firm — Morgan, Lewis & Bockius LLP

(57) ABSTRACT

The present disclosure provides a shell, a battery module and a battery pack. The shell according to the present disclosure comprises: an enclosing frame which has two side walls, a top wall, a bottom wall and a receiving cavity; two end plates which respectively securely connect with the two ends of the enclosing frame. And each side wall is formed with a fixing rib protruding outwardly along a width direction, the fixing rib is provided with at least one through hole. A battery module comprises the above-mentioned shell. A battery pack according to the present disclosure comprises: a lower casing; the plurality of above-mentioned battery modules received in the lower casing; and a plurality of fasteners, each fastener passes through the corresponding through hole of the battery module to secure the battery module in the lower casing.

5 Claims, 4 Drawing Sheets

SHELL, BATTERY MODULE AND BATTERY PACK

CROSS-REFERENCE TO RELATED APPLICATIONS

The present application claims priority to Chinese patent application No. CN201721886951.9, filed on Dec. 28, 2017, which is incorporated herein by reference in its entirety.

FIELD OF THE PRESENT DISCLOSURE

The present disclosure relates to the field of battery, and particularly relates to a shell, a battery module and a battery pack.

BACKGROUND OF THE PRESENT DISCLOSURE

The traditional method that a battery module is fixed in a battery box is: each end plate at two ends of the battery module is provided with a through hole passing through the end plate along an up-down direction, and then a long bolt passes through the corresponding through hole of each end plate at each end of the battery module so as to lock the battery module to a bottom of the battery box. This fixing method has the following problems: (1) because the battery module is fixed at the two ends, the fixing form is single, which causes the assembling manner of the battery module in the battery box to be limited; (2) a shell of the battery module and the end plates are secured by welding or coating an adhesive, which causes the assembling process to be complex, and the connecting strength to be affected by the assembling process, and the size of the through hole of the battery module to be affected by the assembling tolerance; (3) the end plate of the traditional battery module is thick, which results in that the cost of the end plate is high and the spaces at two ends are waste.

SUMMARY OF THE PRESENT DISCLOSURE

In view of the problem exiting in the background, an object of the present disclosure is to provide a shell, a battery module and a battery pack, which can increase the strength of the battery module, and make the assembling convenient, reduce the overall weight and the cost of the battery module and the battery pack.

In order to achieve the above object, in a first aspect, the present disclosure provides a shell comprising: an enclosing frame which has two side walls, a top wall, a bottom wall and a receiving cavity, the receiving cavity is enclosed by the two side walls, the top wall and the bottom wall and has openings respectively opened at two ends in a length direction; two end plates respectively securely connected with the two ends of the enclosing frame in the length direction to respectively seal the openings of the receiving cavity. Each side wall is formed with a fixing rib protruding outwardly along a width direction, the fixing rib is provided with at least one through hole passing through the fixing rib along a height direction.

In order to achieve the above object, in a second aspect, the present disclosure provides a battery module comprising the shell according to the first aspect of the present disclosure.

In order to achieve the above object, in a third aspect, the present disclosure provides a battery pack comprising: a lower casing; the plurality of battery modules according to the second aspect of the present disclosure received in the lower casing; and a plurality of fasteners, each fastener passes through the corresponding through hole of the battery module to fix the battery module in the lower casing.

The present disclosure has the following beneficial effects: when the shell is applied to a battery module described below and in turn is applied to a battery pack described below, the through hole provided on the fixing rib of the side wall can be used to perform function of fixation, so that the battery module is fixed to a lower casing of the battery pack by using the through hole, which avoids using a thick end plate to fix the battery module in the prior art, and reduces the overall weight and the cost of the battery module and the battery pack, and makes the assembling convenient; in addition, the fixing rib is provided on the side wall, which effectively increases the strength of the shell of the battery module.

Figure 1:
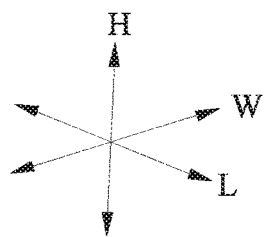
FIG. 1 is an exploded perspective view of a shell according to the present disclosure.
Figure 1:
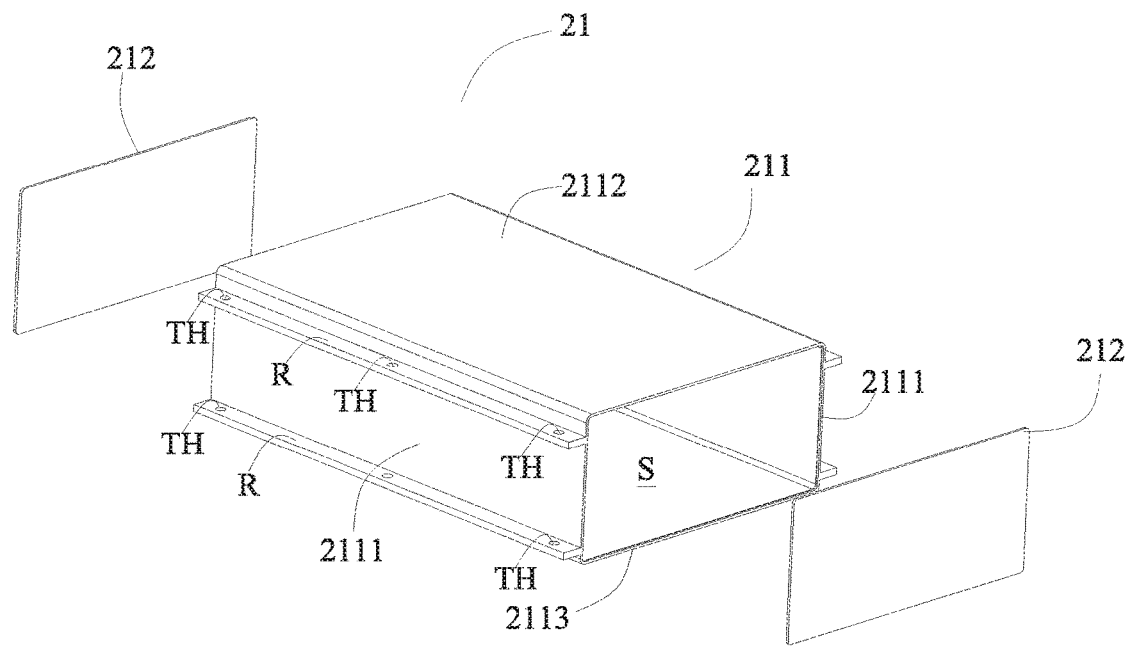

REFERENCE NUMERALS ARE REPRESENTED AS FOLLOWS:

1 lower casing
11 enclosing plate
111 enclosing wall
12 bottom plate
13 support plate
fh fixing hole
2 battery module
21 shell
211 enclosing frame
2111 side wall
R fixing rib
TH through hole
2112 top wall
2113 bottom wall
S receiving cavity
212 end plate
3 fastener
L length direction
W width direction
H height direction

DETAILED DESCRIPTION

Hereinafter a shell, a battery module and a battery pack according to the present disclosure will be described in detail in combination with the figures.

Firstly, a shell according to a first aspect of the present disclosure will be described.

As shown in FIG. 1, a shell 21 according to the present disclosure comprises: an enclosing frame 211 which has two side walls 2111, a top wall 2112, a bottom wall 2113 and a receiving cavity S, the receiving cavity S is enclosed by the two side walls 2111, the top wall 2112 and the bottom wall 2113 and has openings respectively opened at two ends in a length direction L; two end plates 212 respectively securely connected with the two ends of the enclosing frame 211 in the length direction L to respectively seal the openings of the receiving cavity S. Each side wall 2111 is formed with a fixing rib R protruding outwardly along a width direction W, the fixing rib R is provided with at least one through hole TH passing through the fixing rib R along a height direction H.

In the shell 21 according to the present disclosure, each side wall 2111 of the shell 21 is formed with the fixing rib R protruding outwardly along the width direction W, the fixing rib R is provided with at least one through hole TH passing through the fixing rib R along the height direction H, when the shell 21 is applied to a battery module 2 described below and in turn is applied to a battery pack described below, the through hole TH provided on the fixing rib R of the side wall 2111 can be used to perform function of fixation, so that the battery module 2 is fixed to a lower casing 1 of the battery pack described below by using the through hole TH, which avoids using a thick end plate to fix the battery module in the prior art, and reduces the overall weight and the cost of the battery module 2 and the battery pack, and makes the assembling convenient; in addition, the fixing rib R provided on side wall 2111 performs function as a reinforcing rib, which effectively increases the strength of the shell 21 of the battery module 2.

The fixing rib R extends over an overall length of the side wall 2111 along the length direction L.

The fixing rib R of each side wall 2111 is provided as two in number, the two fixing ribs R are respectively provided on an upper side and a lower side of each side wall 2111 in the height direction H. Of course, the fixing rib R can be provided as one or more than two in number, which depends on the specific assembling situation and is not limited to this.

The enclosing frame 211 and the two end plates 212 are fixed together by welding or an adhesive. Thus sealing of the battery module 2 can be achieved when the shell 21 is applied to the battery module 2.

In the shell 21 according to the present disclosure, the two side walls 2111, the top wall 2112, the bottom wall 2113 and the fixing ribs R of the enclosing frame 211 are formed integrally. A material of the enclosing frame 211 is metal or plastic. When the material of the enclosing frame 211 is metal, the enclosing frame 211 can be formed by extrusion process or die casting process. When the material of the enclosing frame 211 is plastic, the enclosing frame 211 can be formed by extrusion process. While the through hole TH on the fixing rib R is formed by subsequent processing.

Correspondingly, a material of the end plate 212 is metal or plastic. The metal is selected from one of aluminum and iron. The plastic is selected from one of ABS and PA.

Secondly, a battery module according to a second aspect of the present disclosure will be described.

Figure 2:
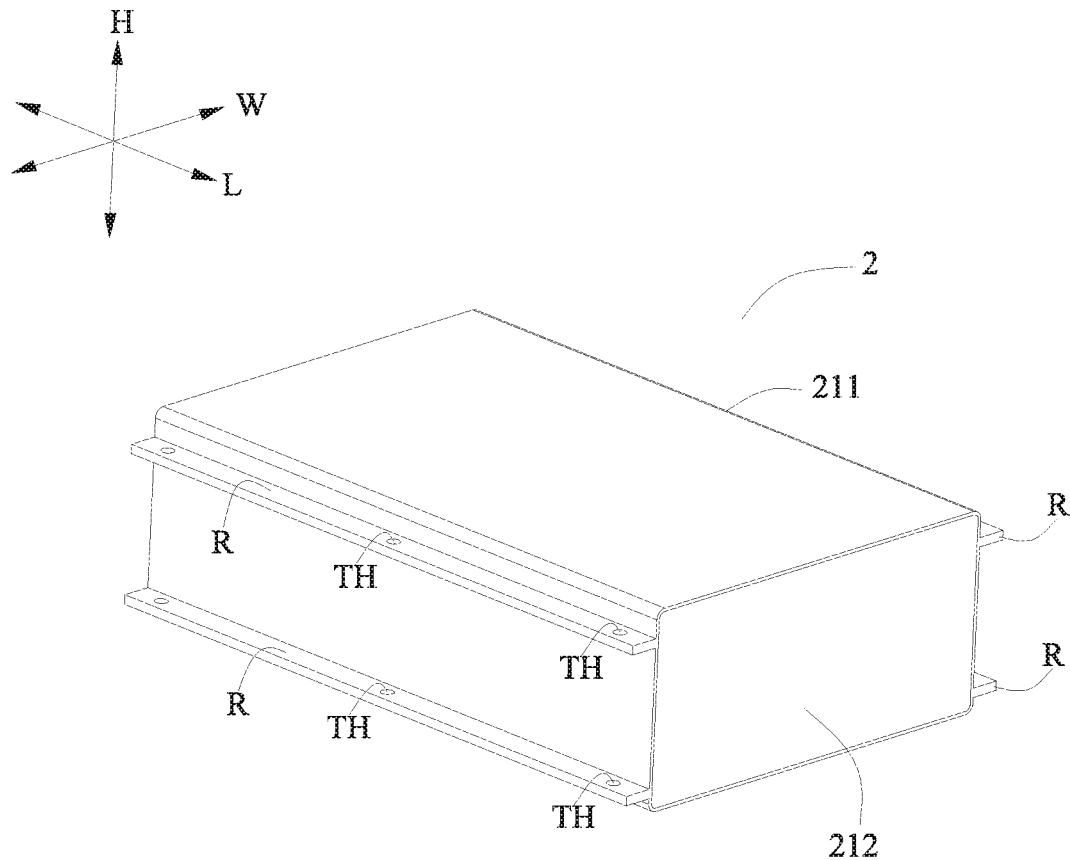
FIG. 2 is an assembled view of a battery module according to the present disclosure.
Figure 3:
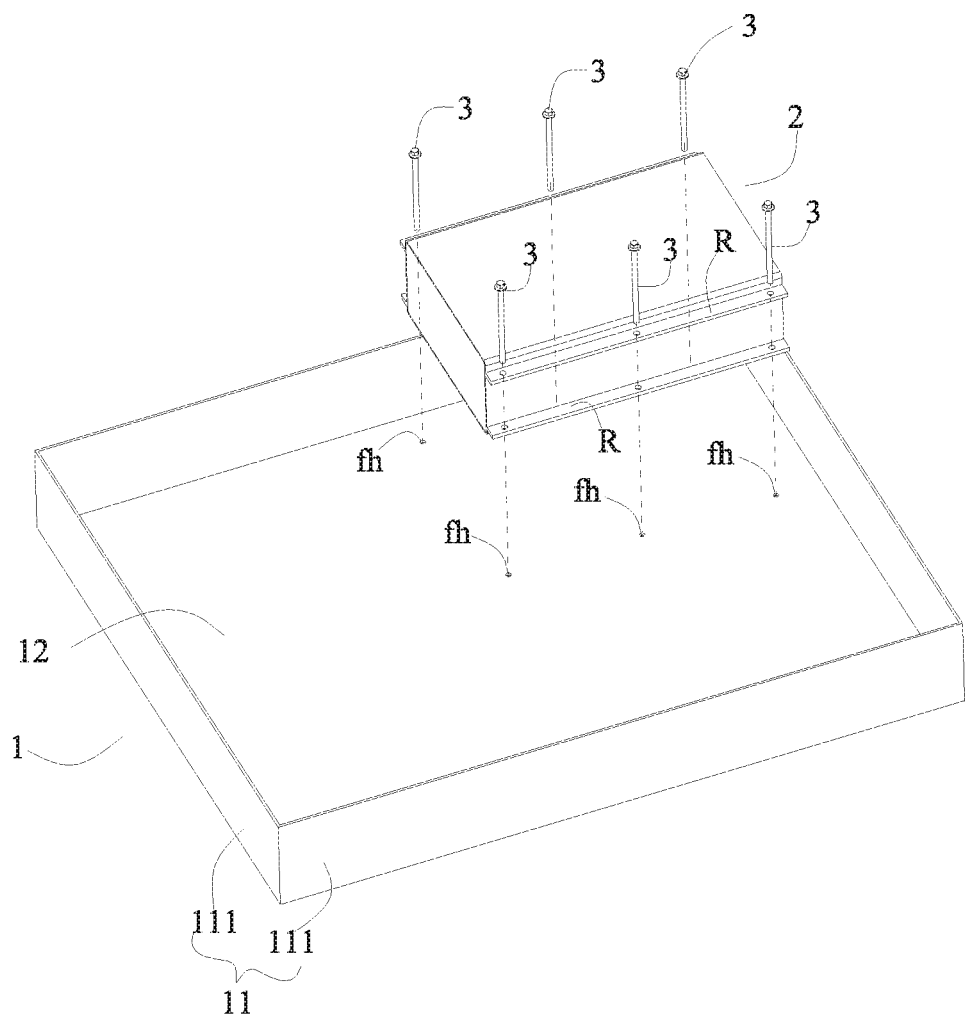
FIG. 3 is an exploded perspective view of an embodiment of a battery pack according to the present disclosure.
Figure 4:
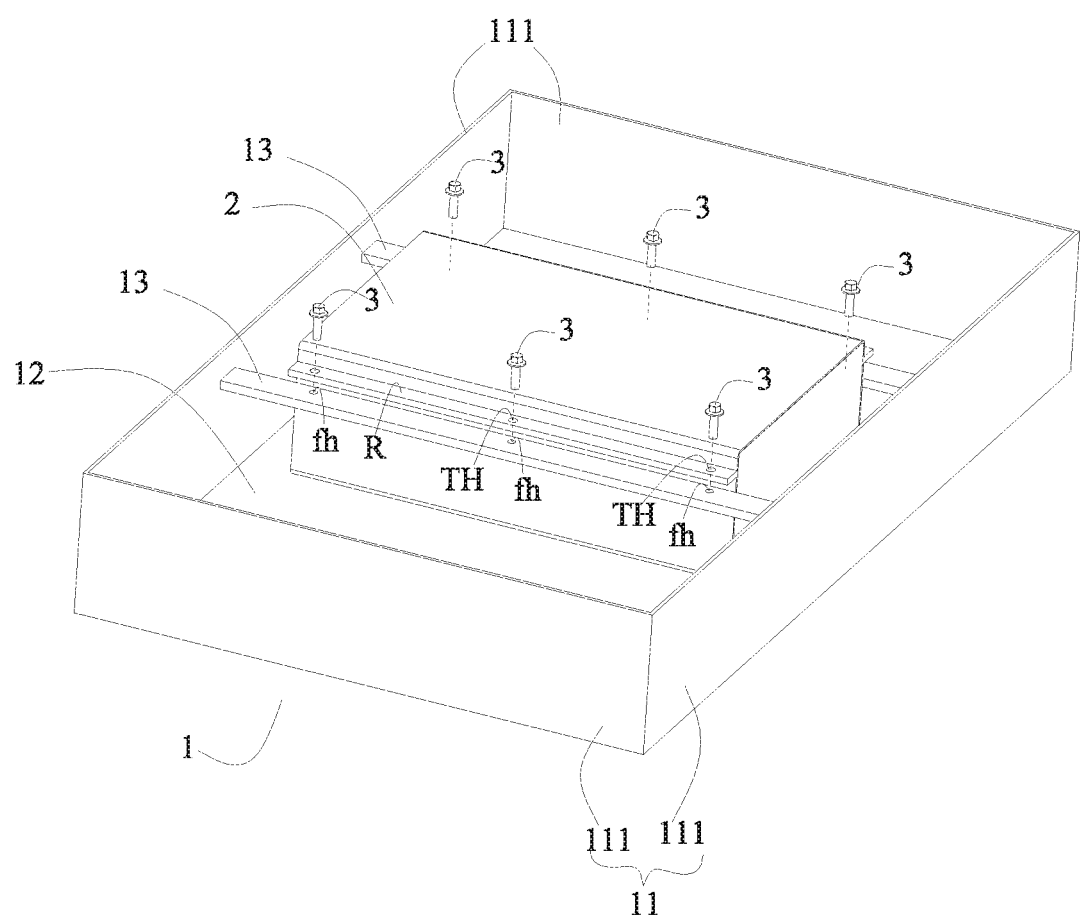
FIG. 4 is an exploded perspective view of another embodiment of the battery pack according to the present disclosure.

Referring to FIG. 2 and combining with FIG. 3 and FIG. 4, a battery module 2 according to the present disclosure comprises the shell 21 according to the first aspect of the present disclosure.

When the battery modules 2 of the present disclosure are assembled into a battery pack, each side wall 2111 of the shell 21 of the battery module 2 is formed with the fixing rib R protruding outwardly along the width direction W, the fixing rib R is provided with at least one through hole TH passing through the fixing rib R along the height direction H, the through hole TH provided on the fixing rib R of the side wall 2111 can be used to perform function of fixation, so that the battery module 2 is fixed to the lower casing 1 of the battery pack described below by using the through hole TH, which avoids using a thick end plate to fix the battery module in the prior art, and reduces the overall weight and the cost of the battery module 2 and the battery pack, and makes the assembling convenient; in addition, the fixing rib R provided on side wall 2111 performs function as a reinforcing rib, which effectively increases the strength of the shell 21 of the battery module 2.

The fixing rib R of the shell 21 extends over the overall length of the side wall 2111 along the length direction L.

The fixing rib R of each side wall 2111 is provided as two in number, the two fixing ribs R are respectively provided on the upper side and the lower side of each side wall 2111 in the height direction H. Of course, the fixing rib R can be provided as one or more than two in number, which depends on the specific assembling situation and is not limited to this.

Finally, a battery pack according to a third aspect of the present disclosure will be described.

Referring to FIG. 3 and FIG. 4, a battery pack according to the present disclosure comprises: a lower casing 1; the plurality of battery modules 2 according to the second aspect of the present disclosure received in the lower casing 1; and a plurality of fasteners 3, each fastener 3 passes through the corresponding through hole TH of the battery module 2 to fix the battery module 2 in the lower casing 1.

In the battery pack according to the present disclosure, each battery module 2 is fixed in the lower casing 1 by the fastener 3 passing through the corresponding through holes TH, which effectively achieves the fixation of the battery module 2, avoids fixing the battery module by the thick end plates at the front end and the rear end in the prior art, reduces the overall weight and the cost of the battery module 2 and in turn reduces the overall weight of the battery pack, and each battery module 2 is fixed by the fasteners 3, which makes the assembling of the battery pack convenient and improves the assembling efficiency of the battery pack; in addition, the fixing rib R provided on the side wall 2111 of the battery module 2, which performs function as a reinforcing rib, effectively improves the strength of the battery module 2.

In the battery pack according to the present disclosure, the battery module 2 can be fixed in many ways. In an embodiment, referring to FIG. 3, the lower casing 1 comprises: an enclosing plate 11; and a bottom plate 12 provided with a plurality of fixing holes fh extending in the height direction H, each fixing hole fh corresponds to the corresponding through hole TH of the battery module 2; and each fastener 3 passes through the corresponding through hole TH of each side wall 2111 of the corresponding battery module 2 and is fixed to the corresponding fixing hole fh of the bottom plate 12 so as to fix the battery module 2 in the lower casing 1.

In the above embodiment, the fixing rib R of each side wall 2111 of the battery module 2 is provided as two in number, and the two fixing ribs R are provided on an upper side and a lower side of each side wall 2111 in the height direction H; and each fastener 3 sequentially passes through the corresponding two through holes TH of the two fixing ribs R of each side wall 2111 of the battery module 2 and is fixed to the corresponding fixing hole fh of the bottom plate 12 so as to fix the battery module 2 in the lower casing 1. The fixing rib R is provided as two in number, which increases the fixing stability of the battery module 2, of course, the number of the fixing rib R is not limited to this, it can be provided as one or more than two in number.

In another embodiment, referring to FIG. 4, the lower casing 1 comprises: an enclosing plate 11 composed of four enclosing walls 111; a bottom plate 12 connected with the enclosing plate 11; and a plurality of support plates 13, spaced apart from each other and suspended between the two opposite enclosing walls 111, each support plate 13 is provided with a plurality of fixing holes fh extending in the height direction H; and each battery module 2 is provided between two adjacent support plates 13, and the fixing rib R of each side wall 2111 of the battery module 2 laps on an upper surface of the support plate 13, each fastener 3 passes through the corresponding through hole TH of the each side wall 2111 and is fixed in the corresponding fixing hole fh on the support plate 13 so that the battery module 2 is fixed on the two adjacent support plates 13.

In the above embodiment, the fixing rib R of the each side wall 2111 of each battery module 2 is provided as one in number; and each fastener 3 passes through the through hole TH of the fixing rib R of each side wall 2111 of the corresponding battery module 2 and is fixed to the corresponding fixing hole fh on the support plate 13 so as to fix the battery module 2 on the support plate 13. The fixing hole fh on the support plate 13 may either pass through the support plate 13 or may not pass through the support plate 13.

In the battery pack according to the present disclosure, in an embodiment, the fastener 3 is a screw bolt, the fixing hole fh is a screw hole; the fastener 3 and the fixing hole fh is screwed with each other, which is convenient to assemble and disassemble. Of course it is not limited to that, the fastener 3 also can be a fixing nail without a screw thread, which inserts into the through hole TH and the fixing hole fh in interference-fit or riveting to fix the battery module 2 in the lower casing 1. It should noted that, the fixing hole fh on the bottom plate 12 may either pass through the bottom plate 12 in the height direction H a or may not pass through the bottom plate 12 in the height direction H.

A material of the lower casing 1 is metal, plastic or composite material. Correspondingly, a material of the fastener 3 may be metal or plastic.

What is claimed is:

1. A battery pack, comprising:
   a lower casing;
   a plurality of battery modules received in the lower casing, each battery module comprising a shell, the shell comprising:
     an enclosing frame which has two side walls, a top wall, a bottom wall and a receiving cavity, the receiving cavity being enclosed by the two side walls, the top wall and the bottom wall and having openings respectively opened at two ends in a length direction;
     two end plates respectively securely connected with the two ends of the enclosing frame in the length direction to respectively seal the openings of the receiving cavity;
     each side wall being formed with a fixing rib protruding outwardly along a width direction, and the fixing rib being provided with at least one through hole passing through the fixing rib along a height direction; and
   a plurality of fasteners, each fastener passing through the corresponding through hole of the fixing rib to fix the battery module in the lower casing,
   wherein the lower casing comprises:
     an enclosing plate composed of four enclosing walls;
     a bottom plate connected with the enclosing plate; and
     a plurality of support plates spaced apart from each other and suspended between the two opposite enclosing walls, each support plate is provided with a plurality of fixing holes extending in the height direction;
   each battery module is provided between two adjacent support plates, and the fixing rib of each side wall of the battery module laps on an upper surface of the support plate, and each fastener passes through the corresponding through hole of the fixing rib and is fixed in the corresponding fixing hole on the support plate so that the battery module is fixed on the two adjacent support plates.

2. The battery pack according to claim 1, wherein the fixing rib of the each side wall of each battery module is provided as one in number;
   each fastener passes through the through hole of the fixing rib of each side wall of the corresponding battery module and is fixed to the corresponding fixing hole on the support plate so as to fix the battery module on the support plate.

3. The battery pack according to claim 1, wherein the fixing rib extends over an overall length of the side wall along the length direction.

4. The battery pack according to claim 1, wherein the fixing rib of each side wall is provided as two in number, and the two fixing ribs are respectively provided on an upper side and a lower side of each side wall in the height direction.

5. The battery pack according to claim 1, wherein the two side walls, the top wall, the bottom wall and the fixing ribs of the enclosing frame are formed integrally.

\* \* \* \* \*